March 2, 1954 — H. G. MILLER — 2,670,767
BAND SAW GUIDE WITH AN ADJUSTABLE BACK ROLLER
Filed April 23, 1951 — 2 Sheets-Sheet 1

INVENTOR.
Harry G. Miller
BY
ATTORNEY.

March 2, 1954 H. G. MILLER 2,670,767
BAND SAW GUIDE WITH AN ADJUSTABLE BACK ROLLER
Filed April 23, 1951 2 Sheets-Sheet 2

INVENTOR.
Harry G. Miller
BY Thos. E. Scofield
ATTORNEY.

Patented Mar. 2, 1954

2,670,767

UNITED STATES PATENT OFFICE 2,670,767

BAND SAW GUIDE WITH AN ADJUSTABLE BACK ROLLER

Harry G. Miller, Kansas City, Kans., assignor to Grace Miller, Kansas City, Kans.

Application April 23, 1951, Serial No. 222,436

7 Claims. (Cl. 143—162)

This invention relates to method of band-sawing lumber, metal and other materials, and also to a band saw guide whereby the method may be carried out mechanically.

Band saws have an endless flat saw band running over upper and lower pulleys with the down run or flight of the band doing the sawing in order that the sawing thrust on the work will be downward and will be taken by the table on which the work is supported. Ever since the advent of band saws the planes of the down and up runs or flights of the saw band have been kept parallel with each other and at right angles to a line drawn between the two runs; and of necessity the work has had to be moved toward both runs of the saw band along a path normal to a line drawn from one run or flight of the saw band to the other.

The horizontal distance between the two runs or flights of the saw band is determined by the horizontal span of the pulleys, or pulley system over which the saw band runs; and because the work must be moved toward the saw band in a direction normal to a line drawn from one run to the other of the saw band, the horizontal length of the work must not extend from the cutting run of the saw band as far as the up run or flight of the saw band; or any guard or shield that may be present there, for otherwise, the up run or flight of the saw band or its shield or guard would be contacted by the work and the sawing operation by the cutting run of the saw band would be spoiled. This has heretofore severely limited the range of utility of band saws, particularly as to the length of work that could be sawed off.

A principal object of my invention is to provide a method of band sawing lumber, metal and other material whereby the length of the work extending from the cutting run or flight of the saw band toward the other run or flight is not limited or restricted to less than the horizontal distance between the runs or flights of the saw bands and whereby the length of the work from the cutting run toward the other run of the saw band may be longer, and to an unlimited extent, than the horizontal distance between the two runs or flights of the saw band, thus increasing the range of utility of band saws tremendously.

In my prior Patent No. 2,152,906, issued April 4, 1939, I have disclosed a band saw guide whereby the saw blade is guided and reinforced adjacent the work to run true at all times and to prevent lateral movement of the blade adjacent the work and prevent edgewise movement of the blade due to the thrust of the work; and another object of the present invention is to so improve the construction and mounting of the guide of said patent that the guide not only maintains the advantages and functions of said construction but in addition is made to be so adjustable that it can be set to maintain the saw blade portion adjacent the work twisted or canted outwardly so that its plane is diagonally disposed relatively to a straight line drawn between the two runs of the saw band.

Another object of this invention is to improve the adjustable mounting of the rear thrust resisting wheel disclosed in my prior patent whereby the wheel is more positively and firmly prevented from canting in its housing, as will be more fully explained hereinafter.

A further object of this invention is to improve the guide disclosed in my said prior patent with respect to the housing so that the housing more effectively and surely prevents chips adhering to the cutting blade from being carried between the blade and the side blade steadying rollers of the guide.

Other objects of this invention will be in part obvious and in part pointed out hereinafter.

The invention, accordingly, consists of the method, steps, the combinations of elements and arrangement of parts which will be described more fully hereinafter and the scope of the application of which will be set forth in the claims that follow.

In order that a clearer understanding of this invention may be had, attention is hereby directed to the accompanying drawings, forming a part of this application, and illustrating certain possible embodiments of this invention, and in which.

Similar reference characters refer to similar parts throughout the several views of the drawings.

Figure 8:
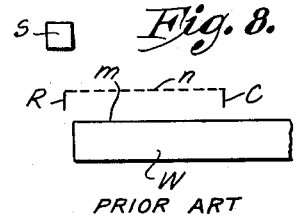
Fig. 8 is a schematic diagram illustrating the prior method of bandsawing lumber, metal and other materials.
Figure 9:
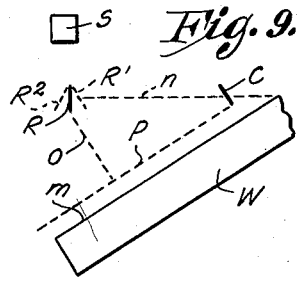
Fig. 9 is a schematic diagram illustrating applicant's improved method of band-sawing lumber, metal and other materials.
Figure 5:
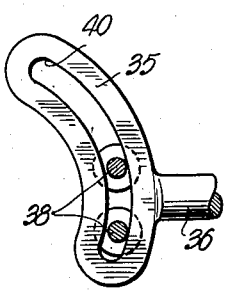
Fig. 5 is a plan view of a detail of the guide mounting and is taken on the line 5—5 of Fig. 1.

Referring to the drawings, and first considering the method, Fig. 8 depicts how band sawing has been done heretofore and Fig. 9 depicts how band sawing is performed in accordance with my new method. In both of these figures S indicates the standard of a band saw, C the cutting run of the saw band, R the return run of the saw band and W the work. In both the old method (Fig. 8) and in my new method (Fig. 9) the work W is advanced to the cutting run C of the saw band with the horizontal leading edge m of the work on a line normal to the plane of the cutting run C adjacent the work W. In the old method (Fig. 8) the planes of both saw band runs have been parallel with each other and at right angles to a straight line n drawn between the saw band runs R and C. Consequently, if the length of the work were such as to extend from the run C to or beyond the return run R the work W would strike both runs R and C at the same time and the run R would interfere with the sawing of the work W by the cutting run C. Accordingly this method of band sawing restricts and limits the range of utility of the band saw to work the length of which from the run C toward the run R is shorter than the distance between the runs R and C.

In accordance with my new method (Fig. 9) I maintain the cutting run C of the saw band adjacent the work W twisted or canted outwardly so that adjacent the work the plane of the cutting run C is not at right angles to the straight line n drawn between the runs R and C. Consequently, the leading edge m of the work W when moved toward the work on a line parallel with the plane of the cutting run C, will approach the line n drawn between the saw band runs R and C diagonally. The result is that work operated on by the cutter run C and extending from the run C toward the run R will not strike the run R until the leading edge m of the work has progressed a distance corresponding to the length of a line o drawn from the front edge of the saw run R to a line p drawn from the front edge of run C parallel to the leading edge m of the work. The length of the line o will vary with the extent the angle between the plane of the cutter run C departs from right angular relation to the line n drawn between the runs R and C. The plane of the cutting run C may depart as much as 45° from a 90° relation to the line n.

Obviously it is immaterial whether the return run R of the saw band also be canted or twisted or not, for instance, to have its plane parallel with the plane of the run C, as indicated at R', or in the other direction as indicated at $R^2$ (see Fig. 9).

A person may manually hold the cutter run C canted or twisted adjacent the work while the work is being cut, using his hands, preferably gloved, or using blocks of metal or other material having suitable slits to slidingly receive the saw band. Meanwhile a second person may feed the work. However, carrying out the method manually is not recommended unless necessity therefor arises with a band saw which is not equipped with mechanical guides for holding the saw band canted or twisted adjacent the work.

Suitable guides for carrying out my new method of band sawing lumber, metal and other materials mechanically may be similar to the band saw guides described in my prior Patent 2,152,906 with a modification which permits the guides to be adjusted to face sidewise to a variable extent instead of only facing directly forwardly.

Referring to the aforementioned patent and to the drawings which form a part of this application, 10 indicates the frame of a band saw of any of the well known types. A vertically adjustable guide post 12, mounted in arm 14 of the frame, is secured in any desired position by means of set screw 16. Mounted respectively on horizontally disposed shafts (see patent) are saw band carrying and driving wheels 21 and 22. An endless saw band 24, mounted on these wheels 21 and 22, passes through a slot 26' formed in a plug 26 rotatably carried on the work table 28 which is carried by frame 10. Table 28 has a slot 28' through which the saw band may be entered into the slot 26' of plug 26. The usual driving means (see patent) serve to drive wheel 22 and cause the saw band to travel in one direction through the slot 26' in the table 28 on which the material to be cut is positioned.

Top guide member 32 comprises a housing frame 34, mounted for swivel or turning adjustment on a plate which may be a head 35 of a stud 36 by means of machine screws 38 which pass through an arcuate slot 40 formed in plate 35, slot 40 being concentric with the axis of the cutting run of the saw band. Stud 36 extends through a socket member 42 carried on the lower end of guide post 12 and is secured in position thereon by set screw 44, socket member 42 being secured to post 12 by a set screw.

Mounted in alignment on spaced apart axes 50, which are in a plane substantially parallel with the working plane of table 28, are rollers 48 that are adapted to be adjusted to respectively contact the opposite sides of the saw band to prevent lateral movement, all as described in my said prior Patent No. 2,152,906; in which patent a preferred construction of rollers is also described. Such adjustable mounting of the side rollers 48 and their particular construction are not claimed as new in this present disclosure and therefore will not be described herein in further detail.

The guide disclosed herein, and in my said prior patent, also includes a thrust roller 64 which takes the thrust imposed upon a saw blade as the material being sawed is pushed against the cutting edge of the blade, and consequently, it suffers the major amount of wear. In the prior Patent 2,152,906, provision was made for horizontal adjustment of this thrust roller to compensate for wear, as well as to facilitate shifting the blade forwardly or rearwardly a slight amount for purposes of alignment. However, the adjustment arrangement of the patent tended to squeeze the sides of the housing together and clamp the hub portion of the rotating guide wheel, sometimes causing it to bind slightly; also, the shaft of the wheel sometimes became canted very slightly which spoiled the alignment.

Figures 1, 2, 3, 4:
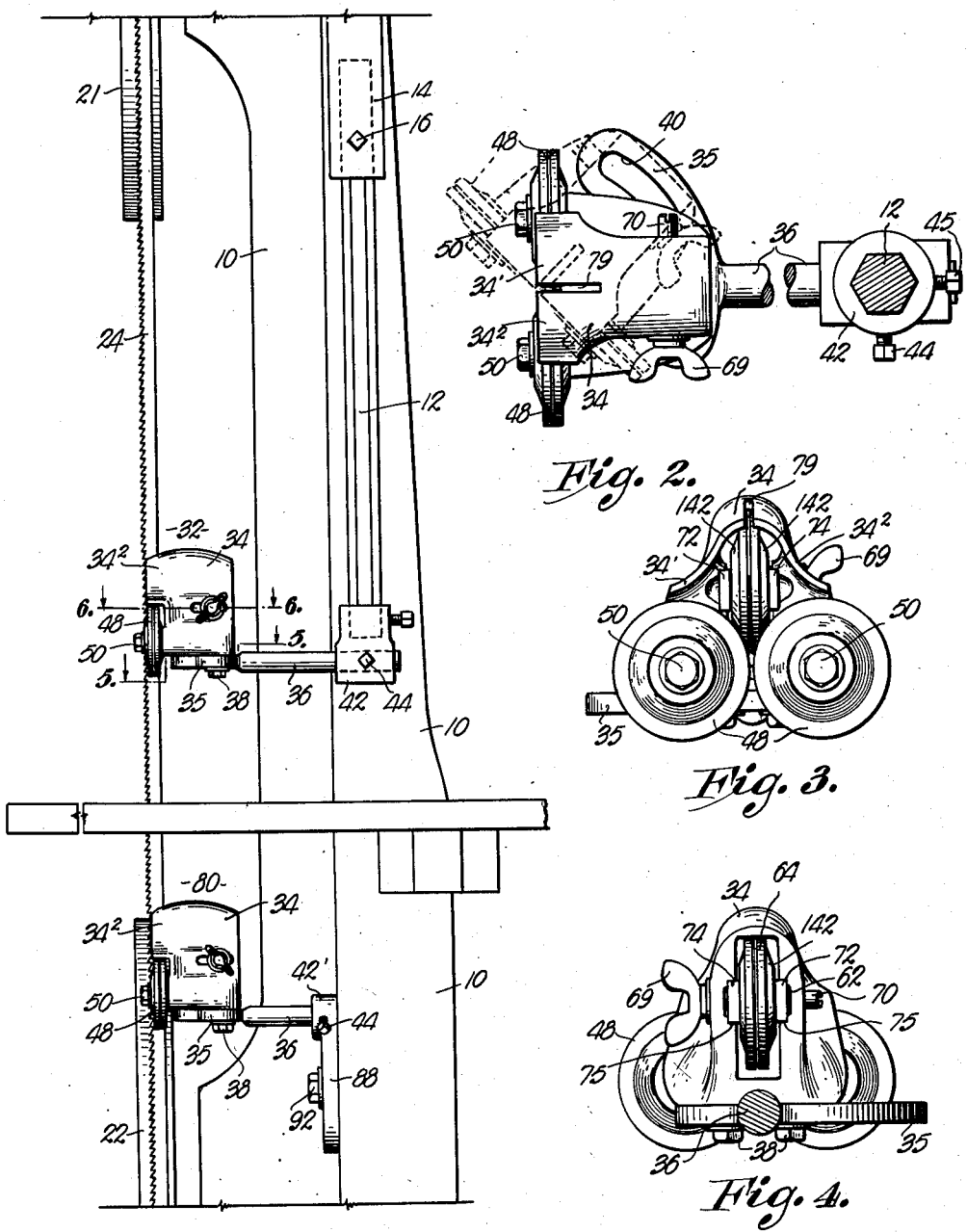
Fig. 1 is a side elevation of a band saw, having upper and lower band saw guides thereon, and embodying this invention, the upper and lower portions of the band saw being cut away and not shown.
Fig. 2 is a plan view of one of the band saw guides and indicates in dotted lines a possible laterally turned position of the guide.
Fig. 3 is a front elevation of the same.
Fig. 4 is a rear elevation of the same.
Figure 6:
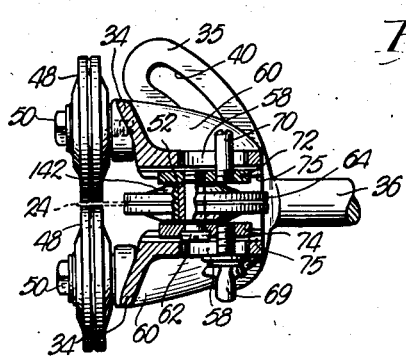
Fig. 6 is a sectional view of one of the guides and is taken on the line 6—6 of Fig. 1.

These difficulties have been overcome in the present device by providing a pair of blocks 72, 74 (Figs. 3, 4 and 6) which are clamped by a screw 62 against the inner race 52 of the ball bearing assembly which supports the wheel. As is conventional, the inner race is a sleeve extending through the wheel and in this instance acts as a spacer between the blocks 72 and 74; the outer race 142 and the opposite sides of the wheel 64 are spaced slightly inward from the inner faces of the two blocks, so there is now a rigid assembly comprising the two blocks 72, 74 and the inner bearing race, which assembly rotatably supports the wheel. The two blocks 72, 74 are slidably supported in horizontal channels 75 on the interior of the housing, and by virtue of their rigid relationship and the extended bearing surface they have against the housing, the blocks insure that the thrust wheel always is disposed in the correct plane. Along the blocks 72, 74 each side of the housing 34 has a slot 58. A wing nut 69 extending through one of these slots and engaging block 74 only clamps this one to the housing and does not pull the two sides of the housing together, as was done in the patented arrangement, so that the difficulties pointed out before are avoided. Another set screw 70 extending through the other slot 58 is engaged with block 72 for guiding purposes.

Another feature resides in the shape of the housing which not only completely covers the thrust wheel 64, but at its forward edge diverges downwardly from the opposite sides of the saw blade as at 34' and 34² over the crown of the two side wheels 48. The top of the housing 34 has a slit 79 on top through which the saw band runs; the object of this is to help "peel off" any cuttings that may be clinging to the saw blade and insure that they are thrown far enough outwardly that they cannot be caught between the lateral face of the descending saw blade and the adjacent guide wheel. This is of considerable importace when metal or other relatively hard materials are being sawed because the cuttings of such materials, if allowed to pass between the lateral guide rolls and the side faces of the saw blade, are capable of doing a great deal of damage both to the rolls and to the blade by virtue of their abrasive action.

The upper guide 32 is duplicated at 80 below the work table 28, and is of the same construction as the upper guide 32, having the same swivel mounting on the plate 35 by means of the machine screws 38 which pass through the arcuate slot 40 in the plate 35, but with this lower guide 80 the stud 36 which carries plate 35 enters a socket 42' formed on the upper end of an arm or plate 88 adjustably secured to the frame 10 of the band saw by means of a bolt 92 which is carried on the frame 10 and extends through a slot 90 formed in the arm or plate 88.

Figure 7:
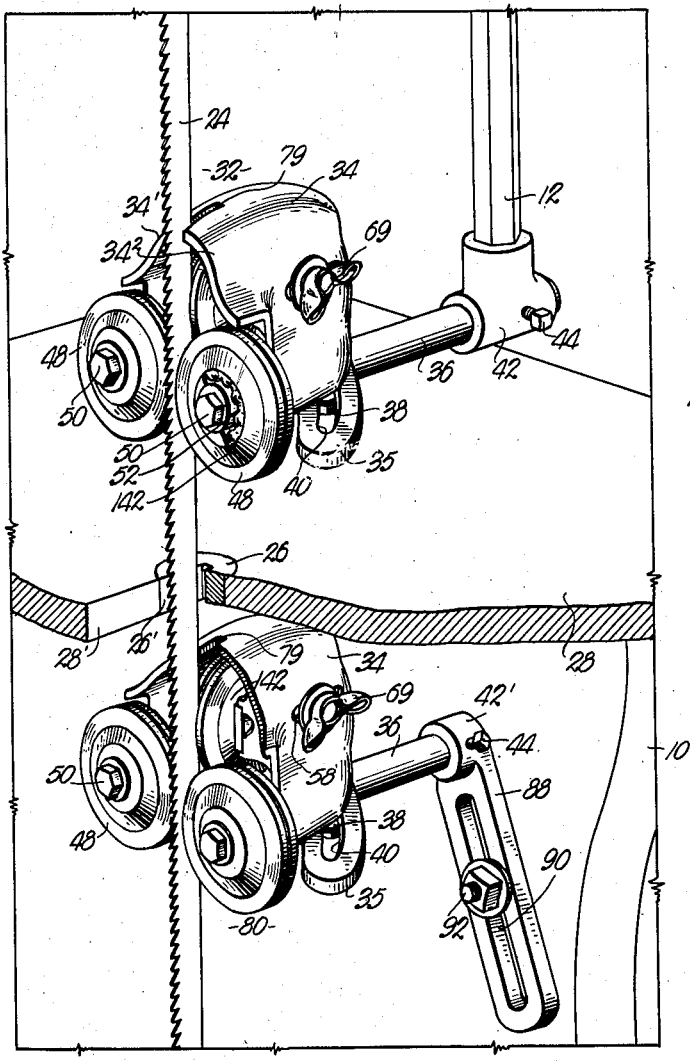
Fig. 7 is a perspective view, partly in section, of the center portion of the cutting run of a band saw equipped with saw band guides and their mounting means, embodying this invention.

Obviously, the arcuate slot 40 of any guide 32 or 80 may extend either to the right or to the left of the axis of the stud 36 or to extend in both directions of the axis of the stud 36. Figs. 1, 2, 3, 4, 5 and 6 of the drawings herein show the slots 40 extending to the left of stud 36 so that the guides can be swung to face toward the right, and Fig. 7 shows the slots 40 extending to the right of the axis of stud 36. The former is intended for use when the right hand run or flight of the saw band is the cutting run or flight, and the latter is intended for use when the left hand run or flight of the saw band is the downmoving and cutting run of the saw band. As stated, the plate 35 may be constructed to have the arcuate slot 40 extend laterally in both directions from the axis of stud 36 so that the mounting will permit swivel turning and adjustment of the guide 32 or 80 either to the right or to the left relatively to the axis of stud 36 and permit my improved method to be carried with either the right or the left run or flight of the saw band being used as the cutting run or flight.

The improvements I have made in the construction and mounting of the guide disclosed in my prior Patent No. 2,152,906 will be apparent from the above description and exposition. However, inasmuch as many different embodiments of the swivel mounting of the guide and of its construction may be made without departing from the scope of this invention, it is understood that all matter contained in the above description of method and apparatus or shown in the accompanying drawings be interpreted as illustrative and not in a limiting sense.

Having thus described my invention, I claim:

1. A band saw guide of the character described, including, in combination, a housing having spaced apart sides, horizontal channels on the inner faces of said sides and facing each other, a carrying block shiftably mounted in each channel, a guide wheel between said blocks, an axle rotatably supporting said wheel on and between said blocks, said axle and blocks comprising a rigid unitary assembly, a slot through each of the sides of the housing at the said channels thereof, a locking screw extending through one of said slots and engaging one of said blocks and adapted to lock said block to said housing against horizontal shifting movement in its channel and a guide finger carried on the other block and extending through the slot in the other side of the housing.

2. A band saw guide as set forth in claim 1 and in which the axle for said guide wheel includes a screw and an inner ball race mounted on the screw, said race being proximate the screw and protruding sidewise of the wheel on both sides further than the other areas of the sides of the wheel, said screw adapted to clamp said carrying blocks against the sides of said inner ball race, whereby said blocks are spaced from the other areas of the sides of the wheel.

3. A band saw guide as in claim 1 wherein said locking screw and guide finger are aligned with one another along a horizontal axis which is parallel to, but spaced laterally from, the axis of said axle.

4. A band saw guide of the character described, including, in combination, a housing having spaced-apart sides, horizontal channels on the inner faces of said sides and facing each other, a pair of spaced-apart blocks slidably received in the respective channels, an axle spanning the space between said blocks with its ends carried by the respective blocks, said axle and blocks comprising a rigid assembly shiftable as a unit in the direction of said channels, the outer faces of said blocks being slidably seated against the bottoms of the respective channels to prevent canting of said axle, said housing having a horizontally elongated slot in one side thereof aligned with one of said channels, means for clamping the outer face of the block in said one channel tightly against the bottom of that channel thereby to lock said assembly against movement, said last means including a screw-threaded member extending outwardly from said last block through said slot and having operative engagement with the exterior of the housing adjacent the slot, and a guide wheel rotatably mounted on said axle between the blocks.

5. A band saw guide of the character described, comprising, in combination, a guide wheel rotatably mounted on a sleeve, the sleeve being slightly longer than the thickness of the wheel whereby its ends project outwardly beyond the sides of the wheel, a pair of carrying blocks abutting the ends of the sleeve, a bolt extending through one of said blocks and through said sleeve with its end screw-threadedly received in the other block to clamp both blocks rigidly to the sleeve, a housing having spaced-apart sides with horizontal channels in the confronting inner faces of the sides, said blocks being slidably received in said channels for horizontal adjustment of said wheel relative to the housing, said channels having vertical bearing surfaces against which the outer faces of said blocks are slidably seated, thereby to prevent canting of said guide wheel relative to the sides of the housing, and means for locking one of said blocks against sliding in its channel, thereby to hold the wheel in adjusted position.

6. A band saw guide of the character described, comprising, in combination, a guide wheel rotatably mounted on a sleeve, the sleeve being slightly longer than the thickness of the wheel whereby its ends project outwardly beyond the sides of the wheel, a pair of carrying blocks abutting the ends of the sleeve, a bolt extending through one of said blocks and through said sleeve with its end screw-threadedly received in the other block to clamp both blocks rigidly to the sleeve, a housing having spaced-apart sides with horizontal channels in the confronting inner faces of the sides, said blocks being slidably received in said channels for horizontal adjustment of said wheel relative to the housing, said channels having vertical bearing surfaces against which the outer faces of said blocks are slidably seated, thereby to prevent canting of said guide wheel relative to the sides of the housing, said blocks being horizontally elongated in the direction of said channels, and an adjustable clamping member connected to one of said blocks at a point spaced horizontally from the axis of said wheel for clamping the portion of said block at said last point tightly to the housing, thereby to hold the wheel in adjusted position.

7. A band saw guide of the character described, comprising, in combination, a guide wheel rotatably mounted on a sleeve, the sleeve being slightly longer than the thickness of the wheel whereby its ends project outwardly beyond the sides of the wheel, a pair of carrying blocks abutting the ends of the sleeve, a bolt extending through one of said blocks and through said sleeve with its end screw-threadedly received in the other block to clamp both blocks rigidly to the sleeve, a housing having spaced-apart sides with horizontal channels in the confronting inner faces of the sides, said blocks being slidably received in said channels for horizontal adjustment of said wheel relative to the housing, said channels having vertical bearing surfaces against which the outer faces of said blocks are slidably seated, thereby to prevent canting of said guide wheel relative to the sides of the housing, said housing having a horizontally elongated slot in one side thereof aligned with one of said channels, means for clamping the outer face of the block in said one channel tightly against said bearing face of that channel, thereby to hold the wheel in adjusted position, said last means including a screw-threaded member extending outwardly from said last block through said slot and having operative engagement with the exterior of the housing adjacent to the slot.

HARRY G. MILLER.

References Cited in the file of this patent

UNITED STATES PATENTS

| Number | Name | Date |
|---|---|---|
| 758,619 | Culpepper | May 3, 1904 |
| 836,446 | Kaudela | Nov. 20, 1906 |
| 1,452,179 | Brenner | Apr. 17, 1923 |
| 1,922,151 | Boice et al. | Aug. 15, 1933 |
| 2,135,488 | Baker | Nov. 8, 1938 |
| 2,152,906 | Miller | Apr. 4, 1939 |

FOREIGN PATENTS

| Number | Country | Date |
|---|---|---|
| 36,065 | France | Jan. 2, 1930 |
| | (Addition to No. 662,574) | |
| 56,029 | Norway | Dec. 2, 1940 |
| 608,767 | Great Britain | Sept. 21, 1948 |